United States Patent
Zhang et al.

(10) Patent No.: US 8,271,941 B2
(45) Date of Patent: Sep. 18, 2012

(54) METHOD AND APPARATUS FOR REPRESENTING AND CONFIGURING FLEXIBLE AND EXTENSIBLE PRESENTATION PATTERNS

(75) Inventors: Liang-Jie Zhang, Cortlandt Manor, NY (US); Abdul Allam, Raleigh, NC (US); Jia Zhang, Schaumburg, IL (US)

(73) Assignee: International Business Machines Corporation, Armonk, NY (US)

( * ) Notice: Subject to any disclaimer, the term of this patent is extended or adjusted under 35 U.S.C. 154(b) by 1723 days.

(21) Appl. No.: 11/554,680

(22) Filed: Oct. 31, 2006

(65) Prior Publication Data

US 2008/0103786 A1 May 1, 2008

(51) Int. Cl.
*G06F 9/45* (2006.01)
(52) U.S. Cl. .................................................. 717/107
(58) Field of Classification Search ............... 717/107
See application file for complete search history.

(56) References Cited

U.S. PATENT DOCUMENTS

| | | | | |
|---|---|---|---|---|
| 5,671,415 | A * | 9/1997 | Hossain | 717/101 |
| 6,968,538 | B2 * | 11/2005 | Rust et al. | 717/108 |
| 7,610,575 | B2 * | 10/2009 | Sproule | 717/103 |
| 2001/0004457 | A1 * | 6/2001 | Pickenhagen et al. | 424/401 |
| 2004/0073661 | A1 * | 4/2004 | Eibach et al. | 709/224 |
| 2006/0069791 | A1 * | 3/2006 | Patrick et al. | 709/230 |
| 2006/0074730 | A1 * | 4/2006 | Shukla et al. | 705/8 |
| 2006/0074731 | A1 * | 4/2006 | Green et al. | 705/8 |
| 2006/0074733 | A1 * | 4/2006 | Shukla et al. | 705/8 |
| 2006/0101475 | A1 * | 5/2006 | Mallet et al. | 719/318 |
| 2007/0127597 | A1 * | 6/2007 | Ammer et al. | 375/324 |

OTHER PUBLICATIONS

Wikipedia, "Service-oriented architecture"; http://en.wikipedia.org/wiki/Service-oriented_architecture.
Wikipedia, "Portlet"; http://en.wikipedia.org/wiki/Portlet.
U.S. Appl. No. 11/554,948, filed Oct. 31, 2006 titled "Method and Apparatus for Service-Oriented Architecture Process Decomposition and Service Modeling" of Zhang et al.

* cited by examiner

*Primary Examiner* — John Chavis
(74) *Attorney, Agent, or Firm* — Ryan, Mason & Lewis, LLP

(57) ABSTRACT

Techniques are provided for representing and configuring flexible and extensible presentation patterns based on fine-grained architectural building blocks (ABBs). The techniques include defining ABBs, modeling the ABBs in a uniform manner, and creating at least one template using the ABBs, wherein the at least one template includes at least one of pre-configured static characteristics and user-specified service characteristics. In an embodiment of the invention, an exemplary method for designing and managing fine-grained ABBs can include identifying ABBs to compose an architecture for facilitating presentation and interaction between consumers and other elements in a solution, analyzing the ABBs to monitor computing resources used by individual ABBs, selecting a number of running instances of the ABBs based on (i) requests of a pertinent entity and (ii) available resources, and managing life-cycles of ABBs.

29 Claims, 13 Drawing Sheets

```
<xsd:schema
    targetNamespace="http://ibm.com/soa-ra/abb/ABBResource"
    xmlns:tns="http://ibm.com/soa-ra/abb/ABBResource"
    xmlns:xs="http://www.w3.org/2001/XMLSchema">

<xsd:element name="ABBId" type="xsd:string"/>
<xsd:element name="ABBName" type="xsd:string"/>
<xsd:element name="ABBAnnotationSchemaURL" type="xsd:string"/>

<xsd:simpleType name="abbLayerEnumeration">
  <xsd:restriction base="xsd:string">
    <xsd:enumeration value="ConsumerLayer"/>
    <xsd:enumeration value="WorkflowProcessLayer"/>
    <xsd:enumeration value="ServiceLayer"/>
    <xsd:enumeration value="ServiceComponentLayer"/>
    <xsd:enumeration value="OperationalSystemLayer"/>
    <xsd:enumeration value="IntegrationLayer"/>
    <xsd:enumeration value="QoSLayer"/>
    <xsd:enumeration value="DataArchitectureLayer"/>
    <xsd:enumeration value="GovernanceLayer"/>
  </xsd:restriction>
</xsd:simpleType>

<xsd:simpleType name="abbStateEnumeration">
  <xsd:restriction base="xsd:string">
    <xsd:enumeration value="Created"/>
    <xsd:enumeration value="Ready"/>
    <xsd:enumeration value="Running"/>
    <xsd:enumeration value="Pending"/>
    <xsd:enumeration value="Terminated"/>
  </xsd:restriction>
</xsd:simpleType>

<xsd:simpleType name="abbProtocolEnumeration">
  <xsd:restriction base="xsd:string">
    <xsd:enumeration value="HTTP"/>
    <xsd:enumeration value="SMTP"/>
  </xsd:restriction>
</xsd:simpleType>

<xsd:simpleType name="dataTypeEnumeration">
  <xsd:restriction base="xsd:string">
    <xsd:enumeration value="Binary"/>
```

*FIG. 3B*

```
      <xsd:enumeration value="PlainText"/>
      <xsd:enumeration value="XML"/>
      <xsd:enumeration value="HTML"/>
    </xsd:restriction>
  </xsd:simpleType>

<xsd:simpleType name="ioTypeEnumeration">
    <xsd:restriction base="xsd:string">
      <xsd:enumeration value="InputOnly"/>
      <xsd:enumeration value="OutputOnly"/>
      <xsd:enumeration value="InputOutput"/>
    </xsd:restriction>
  </xsd:simpleType>

<xsd:element name="ABB">
    <xsd:complexType>
      <xsd:sequence>
        <xsd:element ref="tns:ABBId"/>
        <xsd:element ref="tns:ABBName"/>
        <xsd:element name="ABBLayer" type="abbLayerEnumeration"/>
        <xsd:element name="ABBState" type="abbStateEnumeration"/>
        <xsd:element name="ABBProtocol" type="abbProtocolEnumeration"/>
        <xsd:element name="ABBInputDataType" type="dataTypeEnumeration"/>
        <xsd:element name="ABBOutputDataType" type="dataTypeEnumeration"/>
        <xsd:element name="ABBIOType" type="ioTypeEnumeration"/>
        <xsd:element ref="tns:ABBAnnotationSchemaURL"/>
      </xsd:sequence>
    </xsd:complexType>
  </xsd:element>
  ...
</xsd:schema>
```

FIG. 4

```
<wsdl:definitions
    targetNamespace="http://ibm.com/soa-ra/abb/ABBResource"
    xmlns:wsdl="http://schemas.xmlsoap.org/wsdl/"
    xmlns:xs="http://www.w3.org/2001/XMLSchema"
    xmlns:wsrp="http://www.ibm.com/xmlns/stdwip/web-services/ws-resourceProperties"
    xmlns:tns="http://ibm.com/soa-ra/abb/ABBResource">
...
    <wsdl:types>
      <xs:schema>
        <xs:import namespace="http://ibm.com/soa-ra/abb/ABBResource"
          schemaLocation="..."/>
      </xs:schema>
    </wsdl:types>
...
    </wsdl:portType name="ABBPortType"
  wsrp:resourceProperties="tns:ABBResource">
      <operation name="getABBId"/>
      <operation name="getABBName"/>
      <operation name="getABBLayer"/>
      <operation name="getABBState"/>
      <operation name="getABBProtocol"/>
      <operation name="getABBInputDataType"/>
      <operation name="getABBOutputDataType"/>
      <operation name="getABBIOType"/>
      <operation name="getABBAnnotationURL"/>
...
    </wsdl:portType>
...
</wsdl:definitions>
```

FIG. 5

```xml
<xsd:schema
  targetNamespace="http://ibm.com/soa-ra/abb/ConsumerLayerABBResource"
  xmlns:tns="http://ibm.com/soa-ra/abb/ConsumerLayerABBResource"
  xmlns:xs="http://www.w3.org/2001/XMLSchema">

<xsd:simpleType name="consumerLayerABBEnumeration">
    <xsd:restriction base="xsd:string">
      <xsd:enumeration value="Consumer"/>
      <xsd:enumeration value="Presentation"/>
      <xsd:enumeration value="PresentationControl"/>
      <xsd:enumeration value="ConfigurationRule"/>
      <xsd:enumeration value="ConsumerProfile"/>
      <xsd:enumeration value="Cache"/>
      <xsd:enumeration value="AccessControl"/>
      <xsd:enumeration value="FormatTransformation"/>
    </xsd:restriction>
  </xsd:simpleType>

<xsd:element name="ConsumerLayerABB">
    <xsd:complexType>
      <xsd:sequence>
        <xsd:element ref="tns:ABB"/>
        <xsd:element name="ConsumerLayerABBType" type="consumerLayerABBEnumeration"/>
      </xsd:sequence>
    </xsd:complexType>
  </xs:element>
</xs:schema>
```

FIG. 6

```
<wsdl:definitions
    targetNamespace="http://ibm.com/soa-ra/abb/ConsumerLayerABBResource"
    xmlns:wsdl="http://schemas.xmlsoap.org/wsdl/"
    xmlns:xs="http://www.w3.org/2001/XMLSchema"
    xmlns:wsrp="http://www.ibm.com/xmlns/stdwip/web-services/ws-resourceProperties"
    xmlns:tns="http://ibm.com/soa-ra/abb/ConsumerLayerABBResource">
...
  <wsdl:types>
    <xs:schema>
      <xs:import
         namespace="http://ibm.com/soa-ra/abb/ConsumerLayerABBResource"
         schemaLocation="..."/>
    </xs:schema>
  </wsdl:types>
...
  <wsdl:portType name="ConsumerLayerABBPortTypeName"
    wsrp:resourceProperties="tns:ConsumerLayerABBResource">
    <operation name="getABBId"/>
    <operation name="getABBName"/>
    <operation name="getABBLayer"/>
    <operation name="getABBState"/>
    <operation name="getABBProtocol"/>
    <operation name="getAbbInputDataType"/>
    <operation name="getAbbOutputDataType"/>
    <operation name="getABBIOType"/>
    <operation name="getABBAnnotationURL"/>
    <operation name="getConsumerLayerABBType"/>
...
  </wsdl:portType>
...
</wsdl:definitions>
```

FIG. 7

```
<xsd:schema
  targetNamespace="http://ibm.com/soa-ra/abb/ConsumerABBResource"
  xmlns:tns="http://ibm.com/soa-ra/abb/ConsumerABBResource"
  xmlns:xs="http://www.w3.org/2001/XMLSchema">

<xsd:simpleType name="consumerTypeEnumeration">
    <xsd:restriction base="xsd.string">
      <xsd:enumeration value="Desktop"/>
      <xsd:enumeration value="PDA/Wireless"/>
      <xsd:enumeration value="Program"/>
      <xsd:enumeration value="ConfigurationRule"/>
      <xsd:enumeration value="ConsumerProfile"/>
      <xsd:enumeration value="Cache"/>
      <xsd:enumeration value="AccessControl"/>
      <xsd:enumeration value="FormatTransformation"/>
    </xsd:restriction>
  </xsd:simpleType>

<xsd:element name="ConsumerABB">
    <xsd:complexType>
      <xsd:sequence>
        <xsd:element ref="tns:ConsumerLayerABB"/>
        <xsd:element name="ConsumerType" type="consumerTypeEnumeration"/>
      </xsd:sequence>
    </xsd:complexType>
  </xs:element>
</xs:schema>
```

FIG. 8

```
<wsdl:definitions
  targetNamespace="http://ibm.com/soa-ra/abb/ConsumerABBResource"
  xmlns:wsdl="http://schemas.xmlsoap.org/wsdl/"
  xmlns:xs="http://www.w3.org/2001/XMLSchema"
  xmlns:wsrp="http://www.ibm.com/xmlns/stdwip/web-services/ws-resourceProperties"
  xmlns:tns="http://ibm.com/soa-ra/abb/ConsumerABBResource">
...
  <wsdl:types>
    <xs:schema>
      <xs:import
        namespace="http://ibm.com/soa-ra/abb/ConsumerABBResource"
        schemaLocation="..."/>
    </xs:schema>
  </wsdl:types>
...
  <wsdl:portType name="ConsumerABBPortTypeName"
    wsrp:resourceProperties="tns:ConsumerABBResource">
    <operation name="getABBId"/>
    <operation name="getABBName"/>
    <operation name="getABBLayer"/>
    <operation name="getABBState"/>
    <operation name="getABBProtocol"/>
    <operation name="getAbbInputDataType"/>
    <operation name="getAbbOutputDataType"/>
    <operation name="getABBIOType"/>
    <operation name="getABBAnnotationURL"/>
    <operation name="getConsumerLayerABBType"/>
    <operation name="getConsumerType"/>
...
  </wsdl:portType>
...
</wsdl:definitions>
```

METHOD AND APPARATUS FOR REPRESENTING AND CONFIGURING FLEXIBLE AND EXTENSIBLE PRESENTATION PATTERNS

FIELD OF THE INVENTION

The present invention generally relates to information technology, and, more particularly, to a method and apparatus for representing and configuring flexible and extensible presentation patterns.

BACKGROUND OF THE INVENTION

A number of techniques exist to help build presentation modules in a workflow solution. Most of them are technology driven (for example, JavaScipt® (JavaScript is a registered trademark of Sun Microsystems, Inc.), the Ajax technique, and the Portlet technique) rather than architecture driven. The Ajax technique, for example, provides a non-intrusive content refreshing architecture for Web-based presentations. The Portlet technique, as another example, provides a modularized layout framework to define a presentation interface However, the evolution of underlying technologies may result in the need to change implementations of those existing approaches. As the market-place is increasing and demanding flexibility and speed to market, the technology-dependent existing approaches do not help address these needs. Existing architecture-driven techniques are often represented by the model view control (MVC) approach However, these existing architecture-driven approaches stay at high-level abstraction for presentation structures and do no guide to construct fine-grained architecture.

Consequently, the existing approaches lack flexibility and extensibility and are unable to reconfigure their architectural building blocks as needed to adapt to changing requirements of a pertinent organization or other entity. The market place is increasing, and demanding flexibility and speed to market. Technology-dependent solutions do not help address this need. Abstract building blocks are better suited to address this growing need Therefore, there is a need to overcome the limitations of the existing approaches.

SUMMARY OF THE INVENTION

Principles of the present invention provide techniques for representing and configuring flexible and extensible presentation patterns based on fine-grained architectural building blocks (ABBs). An exemplary method (which can be computer-implemented) for representing and configuring flexible and extensible presentation patterns based on fine-grained ABBs, according to one aspect of the invention, can include steps of defining ABBs, modeling the ABBs in a uniform manner, and creating at least one template using the ABBs, wherein the at least one template includes at least one of pre-configured (static) characteristics and user-specified (dynamic) service characteristics.

In one aspect of the invention, the step of defining ABBs includes defining a consumer ABB and a presentation controller ABB, and can also include defining a presentation ABB, a consumer profile ABB, an access control ABB, a format transformation ABB, a configuration rule ABB, and a cache ABB. Also, in another aspect of the invention, the step of defining ABBs includes dividing responsibilities of a presentation module into sub-responsibility areas, wherein the sub-responsibility areas may include a logical grouping or logical groupings of related cohesive functions, and also wherein the sub-responsibility areas may be treated as ABBs. Furthermore, in another aspect of the invention, the step of defining ABBs includes defining attributes that are associated with an ABB, wherein the attributes include at least one of ABB Identifier (ID), ABB Type, ABB State, ABB Protocol, ABB Input Type and Output Type In yet another aspect of the invention, the step of modeling ABBs in a uniform manner includes using a unified framework to model the ABBs. Furthermore, the unified framework may facilitate development of unified interface descriptions for the ABBs. Also, in another aspect of the invention, the step of modeling ABBs in a uniform manner may include defining operations for the ABBs, wherein the operations include at least one of getABBId, get ABBName, getABBLayer, getABBState, getABBProtocol, getABBInputDataType, getABBOuputDataType, getABBIOType, getABBAnnotationURL, getConsumerLayerABBType, and getConsumerType.

Also, in yet another aspect of the invention, the step of creating at least one template using the ABBs includes pre-configuring static templates using ABBs for specific service scenarios. Furthermore, the step of creating at least one template using the ABBs may include selecting appropriate ABBs based on the user-specified service characteristics, and configuring the appropriate ABBs during run time.

In an embodiment of the invention, an exemplary method for designing and managing fine-grained ABBs can include identifying ABBs to include in an architecture for facilitating presentation and interaction between consumers and other elements in a solution, analyzing the ABBs to monitor computing resources used by individual ABBs, selecting a number of running instances of the ABBs based on (i) requests of a pertinent entity and (ii) available resources, and managing lifecycles of ABBs. In one aspect of the invention, the step of managing lifecycles of ABBs includes defining presentation architecture templates, selecting a presentation architecture template based on service scenarios, configuring interfaces of the ABBs, applying interaction patterns for the ABBs with other modules, and enabling access control on the ABBs. Also, in another aspect of the invention, an exemplary method for designing and managing fine-grained ABBs can include enabling granularity enablement state management and handling exceptions.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

BRIEF DESCRIPTION OF DRAWINGS

FIGS. 3A and 3B (as a whole) depict an exemplary textual representation of a segment an ABB in XML Schema, according to another aspect of the invention;

FIG. 4 is an exemplary textual representation a stateful ABB exposed by WSDL operations, according to another aspect of the invention;

FIG. 5 is an exemplary textual representation of a consumer layer ABB in XML Schema, according to another aspect the invention;

FIG. 6 is an exemplary textual representation of a stateful consumer layer ABB exposed by WSDL operations, according to another aspect of the invention;

FIG. 7 is an exemplary textual representation of a consumer ABB in XML Schema, according to another aspect of the invention;

FIG. 8 is an exemplary textual representation of a stateful consumer ABB exposed by WSDL operations, according to another aspect the invention;

DETAILED DESCRIPTION OF PREFERRED EMBODIMENTS

One or more embodiments of the present invention provide a unified representation and definition of architectural building blocks (ABBs) and an associated configuration framework to support the adaptation capability of the presentation module in a workflow solution. This configuration capability is effective because the ABBs are fine-grained. The fine-grained ABBs can be configured based on specified rules on top of a novel configuration framework providing a set of pre-defined architectural patterns. Moreover, the ABBs are based on service scenarios instead of technologies, therefore facilitating more effective alignment of needs of a pertinent organization or other entity with IT environments Also, the inventive techniques create opportunities to offer new services around Service Enablement based on abstract building blocks that are at a higher level of abstraction than concrete service components.

Figure 1:
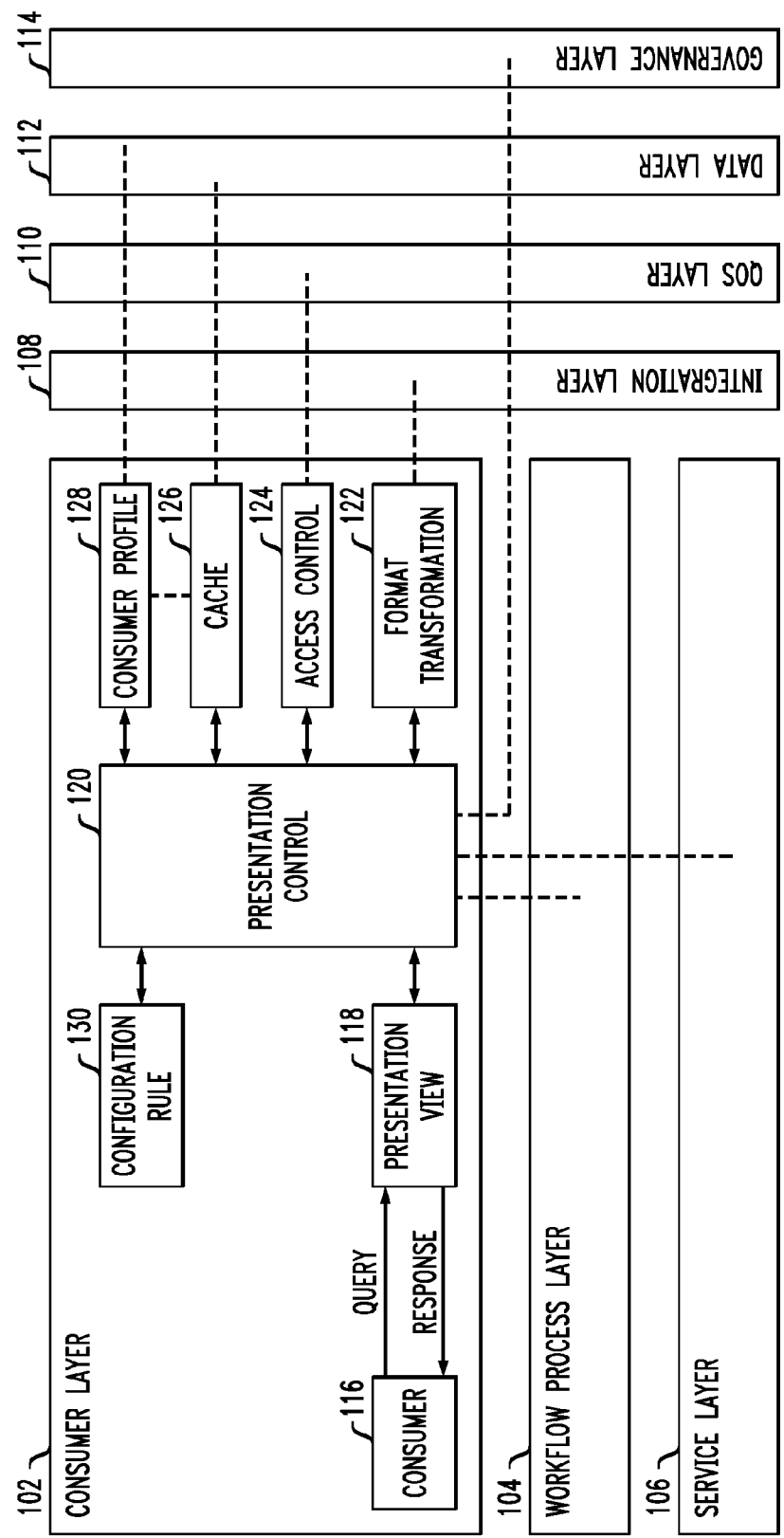
FIG. 1 is a block diagram illustrating exemplary architectural building blocks (ABBs) for building a presentation layer, according to one aspect the invention.

FIG. 1 shows a block diagram illustrating exemplary architectural building blocks (ABBs), according to one aspect of the invention. Since the term "layer" is often used to represent the same concept, the terms "module" and "layer" are used interchangeably herein. Also, as used herein, "workflow process" is intended to encompass a process for a set of interconnected activities toward a goal at any level of granularity. As shown in FIG. 1, one example of a service-oriented architecture (SOA) solution system may include architectural layers including a consumer layer 102, a workflow process layer 104, a service layer 106, an integration layer 108, a Quality of Service (QoS) layer 110, a data layer 112, and a governance layer 114. Consumer layer 102, also referred to as consumer module, may include components in eight categories of Architectural Building Blocks (ABBs) including consumer 116, presentation (view) 118, presentation controller 120, consumer profile 128, access control 124, format transformation 122, configuration rule 130, and cache 126. It should be noted that the invention is not limited to the precise exemplary embodiments detailed above, and that various other changes and modifications may be made by one skilled in the art.

The consumer layer 102 typically interacts with other layers in a service-oriented architecture (SOA) solution, such as, for example, a Workflow Process layer 104 that composes and choreographs service components, (2) a Service layer 106 that manages workflow services, an Integration layer 108 that mediates, routes, and transports service requests from service consumers to proper service providers, a QoS layer 110 that provides QoS management in various aspects, a data layer 112 that provides unified representation and enablement frameworks integrating with domain-specific data architecture, and a governance layer 114 that provides design guidance to ensure proper design of the SOA solution.

A consumer building block 116 represents an external user of the presentation module. It can be, for example, a program or an individual who requests a service. A presentation (view) building block 118 is responsible for obtaining an input via query from a consumer and providing or displaying a response to the consumer In other words, a presentation (view) building block 118 is responsible for communicating to and from the consumer A presentation controller building block 120 manages the navigation logic for consumer interactions. For example, a presentation controller building block 120 may interact with a service in the service layer 106 or a process in the workflow process layer 104. Meanwhile, a presentation controller building block 120 interacts with other ABBs within the Consumer layer 102, such as, for example, customer profile 128 to control navigation based on the consumer profile, access control 124 to determine what content can be presented, and a format transformation 122 to translate to Query data formats required by the integration layer 108 and to convert a response or responses from the integration layer 108 to an appropriate consumer response format A consumer profile building block 128 is responsible for getting customer-specific information (enabled through the data layer 112) to be used by the presentation controller 120 for navigation and content presentation purposes. An access control building block 124 provides authentication and/or authorization capabilities (enabled through the security layer) to be used by the presentation controller 120 to allow and/or prevent the contents to be presented to the consumer. A format transformation building block 122 is responsible for translation of Query content format required by the integration layer 108, and for converting content returned from the integration layer 108 to a consumer response format. A format transformation building block 122 also can be used for transforming content (for example, a message payload can be translated using extensible style-sheet language transformation (XSLT) to a required extensible markup language (XML) format) in the invocation messages to a service or a process. A format transformation building block 122 can typically support multiple XSLTs and other transformation mechanisms It should be noted that this transformation addresses only the changing of content formats for presentation, for example, from XML to hypertext markup language (HTML) or from XML to VoiceXML (VXML). It does not handle the transformation of actual content, which is the responsibility of either the workflow process layer 104 or the service layer 106 (for example, converting to industry-specific message format)

A configuration rule building block 130 is responsible for hosting rules that dictate how the ABBs can be configured based on consumer request scenarios. This unit enables presentation configuration on demand. It also allows the use of only appropriate ABBs. It should be noted that this configuration capability will not be effective if the ABBs are coarse-grained, as it will reduce flexibility. On the other hand, if ABBs are fine-grained, they will be more flexible to be configured based on specified rules. This configuration can be handled, for example, in the following two ways. The first way is through template-based static configuration, where a user can select a specific template based on the corresponding service request scenario The system will select all the rules associated with this template and configure the ABBs to support the rules. This approach requires that scenario templates be created and stored in a repository to be selected when needed. The second way is through dynamic template creation, where a user selects certain characteristics and the system determines the appropriate rules and configures one or more templates using relevant ABBs at run time. For example, a user may specify the following two characteristics: data is static (that is, does not change during an interaction) and the user should not be challenged multiple times. The first characteristic implies that it may be advantageous to use a cache ABB. The second characteristic implies the necessity of using a proper security token mechanism. These characteristics will be used during the run time to configure appropriate ABBs.

A cache building block 126 is responsible for temporarily storing consumer interaction-related data to enhance system performance. These data typically are maintained for the duration of the entire interaction. An example of such a kind of data is a customer profile. The cache building block 126 will increase performance as it minimizes interactions with the Data layer 112.

Figure 2:
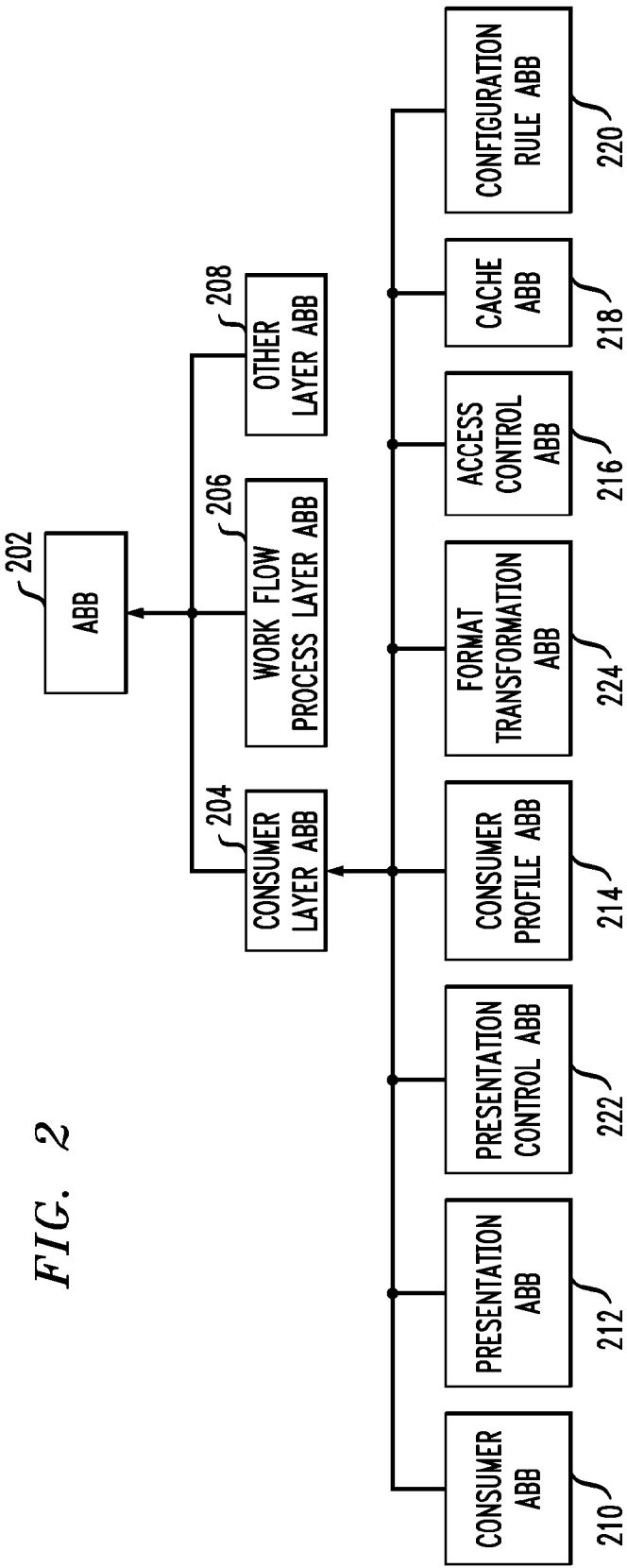
FIG. 2 is a block diagram illustrating an exemplary hierarchical representation ABBs, according to another aspect of the invention.

FIG. 2 is a block diagram illustrating an exemplary hierarchical representation of ABBs, according to another aspect of the invention. In this section, we will illustrate how to model ABBs. We provide a standard, uniform, flexible, and extensible way to model traceable information that can be carried by ABBs. Instead of creating another new description method, we apply the Web Services Resource Framework (WSRF) to define ABBs as universal resources. Initiated by IBM, Computer Associates, Oracle, and other collaborators, WSRF (http://www-128ibmcom/developerworks/library/specification/ws-resource/) defines a system of specifications for managing and accessing stateful resources using Web services. To date WSRF has been extensively used for enabling stateful Web services. In short, WSRF is a reputable XML-based presentation method to capture resources. WSRF enables access to internal states of a resource via Web service interfaces, for example, data values that can persist across and evolve as a result Web service interactions. Before adopting WSRF, we also examined other alternatives, such as resource definition framework (RDF). (See the World Wide Web Consortium's "RDF/XML Syntax Specification" available at http://www.w3org/TR/rdf-syntax-grammar/). As a general-purpose language for presenting information on the Internet, RDF focuses on describing meta-data of any generic resource. Compared to RDF, WSRF utilizes web services technology to expose internal state information of a resource, which better matches our goal of modeling stateful ABBs. However, while WSRF appears preferable for modeling stateful ABBs, one or more embodiments of the invention may employ RDF, or other appropriate language.

In order to model ABBs with reusability, flexibility, and extensibility, we define ABBs in a hierarchical manner. As shown in FIG. 2, various types of ABBs can be organized into a hierarchical inheritance tree-like structure. The root (that is, module 0) of the tree represents the generic ABB 202. Its direct child level (that is, module 1) represents various layers (for example, module-ABB) in a service-oriented architecture (SOA) solution. For example, an SOA solution may identify several modules, such as consumer module, workflow process module, as well as other modules. A dedicated ABB type is constructed to represent each module, such as, for example, ConsumerLayerABB 204, WorkflowProcessLayerABB 206, and others 208. For each module, identified ABB types (for example, module 2) extend from the module-ABB with specific features. For example, as shown in FIG. 2, the ConsumerLayerABB 204 is extended into 8 ABBs: ConsumerABB 210, PresentationABB 212, PresentationControllerABB 222, ConsumerProfileABB 214, AccessControlABB 216, FormatTransformationABB 224, CacheABB 218, and ConfigurationRuleABB 220.

With the organized hierarchy of ABBs, we can model the ABBs in an incremental manner. In more detail, we can first model the generic ABB. Then, we can model the module-ABBs by leveraging the generic ABB. Afterwards, we can leverage a module-ABB to model its extended ABBs FIGS. 3A and 3B (as a whole) depict an exemplary textual representation of a segment 300 of an ABB property definition in XML Schema, according to another aspect of the invention. FIGS. 3A and 3B illustrate relative segments of the resource properties document definitions for a resource component (that is, ABBResource) As shown in FIGS. 3A and 3B, the Web Services Resource (WS-Resource) properties specification document is defined using XML Schema. By way of example, the state of an ABBResource depicted in FIGS. 3A and 3B contains nine elements: (1) ABBId, (2) ABBName, (3) ABBLayer, (4) ABBState, (5) ABBProtocol, (6) ABBInputDataType, (7) ABBOutputDataType, (8) ABBIOType, and (9) ABBAnnotationSchemaURL. Each element is of an XML Schema Definition (XSD) type, either a simple XSD data type or a user-defined data type.

ABBId denotes the unique identifier of the instance of ABB, with XSD type String (xsd:string) ABBName denotes the descriptive name of the instance of ABB, with XSD type String (xsd:string). ABBLayer denotes to which module the defined ABB belongs, with defined type ABBLayerEnumeration containing nine predefined values (ConsumerLayer, WorkflowProcessLayer, ServiceLayer, ServiceComponentLayer, OperationalSystemLayer, IntegrationLayer, QoSLayer, DataArchitectureLayer, and GovernanceLayer). ABBState denotes the life-cycle state of the ABB instance, with defined type abbStateEnumeration containing five predefined values (Created, Ready, Running, Pending, and Destroyed). ABBProtocol denotes the protocol that the ABB instance supports, with defined type abbProtocolEnumeration containing two predefined values (HTTP and SMTP). ABBInputDataType denotes the input data type that the ABB instance supports, with defined type dataTypeEnumeration containing four predefined values (Binary, PlainText, XML, and HTML) ABBOutputDataType denotes the output data type that the ABB instance supports, with defined type dataTypeEnumeration containing four predefined values (Binary, PlainText, XML, and HTML). ABBIOType denotes the input and/or output type supported by the ABB instance, with defined type ioTypeEnumeration containing three predefined values (InputOnly, OutputOnly, and InputOutput). ABBAnnotationSchemaURL denotes the schema file that can be used to interpret any annotations associated with the ABB instance, with XSD type String (xsd:string).

FIG. 4 is an exemplary textual representation 400 of ABB properties exposed by WSDL operations, according to another aspect of the invention. In order for an ABB user to know that the "ABBResource" defines the WS-Resource properties document associated with the Web service, the WS-Resource properties document declaration is associated with the WSDL portType definition in the WSDL definition of the Web service interface, through the use of a standard attribute resourceProperties. As shown in FIG. 4, the portType, with the associated resource properties document, defines the type of the WS-Resource. The portType "ABBPortType" in FIG. 4 defines a set of nine operations to allow users to access the state information of the defined ABBResource (getABBid, getABBName, getABBLayer, getABBState, getABBProtocol, getABBInputDataType, getABBOutputDataType, getABBIOType, and getABBAnnotationURL)

FIG. 5 is a block diagram 500 illustrating an exemplary textual representation of a segment of consumer layer ABB property definition in XML Schema, according to another aspect of the invention. After the resource properties of the generic ABB are defined, the resource properties of its extended sub-ABBs (for example, module-ABBs) can be defined by leveraging those of the generic ABB, and adding specific resource properties. FIG. 5 shows the resource properties of ConsumerLayerABB. Because ConsumerLayerABB is a subclass of the genetic ABB, it automatically inherits all resource properties defined in the genetic ABB. As shown in FIG. 5, the state of a ConsumerLayerABB contains two elements: ABB and an added element ConsumerLayerABBType, which is with defined type consumerLayerABBEnumeration containing eight predefined values (Consumer, Presentation, PresentationControl, ConfigurationRule, ConsumerProfile, Cache, AccessControl, and FormatTransformation)

FIG. 6 is an exemplary textual representation 600 of consumer layer ABB properties exposed by WSDL operations, according to another aspect of the invention The WS-Resource properties document declaration for ConsumerLayerABB is associated with the WSDL portType definition for a user to access the state information of the stateful resource As shown in FIG. 6, the portType "ConsumerLayerABBPortType" defines a set of 10 operations to allow users to access the state information of the defined stateful ConsumerLayerABBResource (getABBId, getABBName, getABBLayer, getABBState, getABBProtocol, getABBInputDataType, getABBOutputDataType, getABBIOType, getABBAnnotationURL, and getconsumerLayerABBType). Note that the operation getConsumerLayerABBType allows a user to obtain the newly added property ConsumerLayerABBType defined in the ConsumerLayerABB Similarly, the resource properties of one of the third-module ABBs ConsumerABB can be defined by leveraging those of ConsumerLayerABB and adding specific resource properties. FIG. 7 is an exemplary textual representation of a segment 700 of consumer ABB property definition in XML Schema, according to another aspect of the invention. FIG. 7 shows the resource properties of ConsumerABB. Because ConsumerABB is a subclass of ConsumerLayerABB, it automatically inherits all resource properties defined in ConsumerLayerABB. As shown in FIG. 7, the state of a ConsumerABB contains two elements. ConsumerLayerABB and an added element ConsumerType that denotes the type of the consumer, whether it is an individual using a desktop computer as a browser, an individual using either a Personal Digital Assistant (PDA) or a wireless phone as a browser; or a program. This property may be used to decide the presentation format, either, for example, to generate HTML pages, or generate Wireless Markup Language (WML) documents, or generate plain text files such as XML documents. The ConsumerType property may be used with defined type consumerTypeEnumeration containing, for example, three predefined values (Desktop, Personal Digital Assistant (PDA)/Wireless, and Program). It should be noted that the invention is not limited to the precise exemplary embodiments detailed above, and that various other changes and modifications may be made by one skilled in the art.

Again, the WS-Resource properties document declaration for ConsumerABB is associated with the WSDL port Type definition for user to access the state information of the stateful resource. FIG. 8 is an exemplary textual representation 800 of consumer ABB properties exposed by WSDL operations, according to another aspect of the invention. As shown in FIG. 8, the portType "ConsumerABBPortType" defines a set of 11 operations to allow users to access the state information of the defined stateful ConsumerABBResource (getABBId, getABBName, getABBLayer, getABBState, getABBProtocol, getABBInputDataType, getABBOutputDataType, getABBIOType, getABBAnnotationURL, getConsumerLayerABBType, and getConsumerType). Note that the operation getConsumerType allows a user to obtain the newly added property ConsumeType defined in the ConsumerABB.

As described above, we set forth in detail how to formally model ABBs, using ad hoc industry standard WSRF, as universal resources, in combinations with the teachings herein of one or more embodiments of the invention. As shown in the examples above, WSRF can be envisioned as a combination of Web Services Description Language (WSDL) with XML Schema. Therefore, an ABB can be formally exposed, for example, by its operations (using WSDL), together with its semantic structure (using XML Schema). In other words, the interface of each ABB is defined by its data structure and operations, in a standardized manner. As a result, any ABBs can easily interact and communicate with each other. It should be noted that ABBs can be modeled using other technologies It should be appreciated by one skilled in the art that WSRF is simply used as an example technology that can be utilized to model ABBs.

Figure 9:
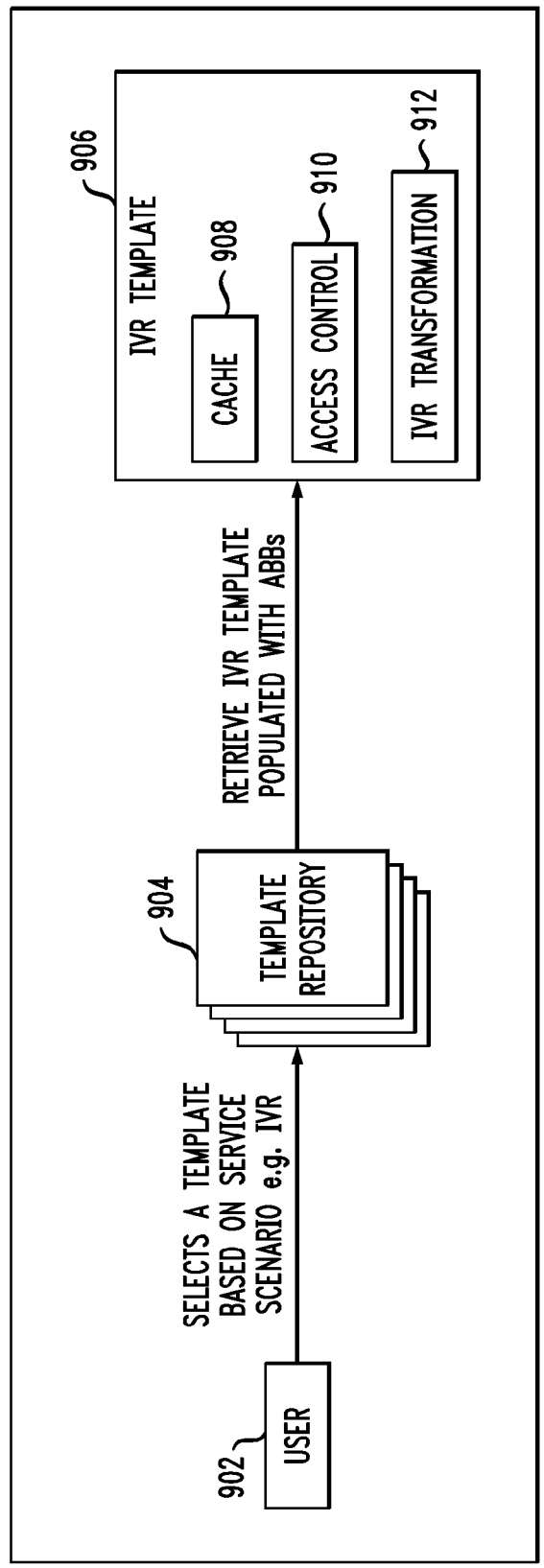
FIG. 9 is a block diagram illustrating an exemplary system that can execute an exemplary method for creating a static template, according to another aspect of the invention.

The following paragraphs describe the configuration framework of ABBs for new services scenarios. The configuration capability will not be very effective if the ABBs are coarse-grained, as this will reduce the flexibility. On the other hand, if ABBs are fine-grained, as shown in FIG. 9, they will become more flexible and hence can be configured based on specified rules. The configuration can be handled, for example, in two ways, as will be described in the discussions of FIG. 9 and FIG. 10.

FIG. 9 is a block diagram illustrating an exemplary system that can execute an exemplary method for creating a static template, according to another aspect of the invention In the template-based configuration approach, a user 902 can select a specific template based on the service request scenario. The system will select all the rules associated with this template and configure the ABBs to support the rules This will require scenario templates to be created and stored in a repository 904 to be selected when a user needs them. For example, we can have a template to support an interactive voice response (IVR) system, another one to support a personal digital assistant (PDA), and a third one to support a Web portal (a Web site providing personalized capabilities to a user), as each template has its own characteristics and rules associated with it Depending on the Consumer layer user, an appropriate template can be selected In FIG. 9, user 902 selects IVR template 906 from the Template repository 904. Each of these templates comes with preconfigured ABBs. As depicted in FIG. 9, an IVR template 906 may include components or ABBs such as cache 908, access control 910, and IVR transformation 912 If a user desires flexibility or customization, then it may be advantageous to configure dynamic templates, as detailed below.

Figure 10:
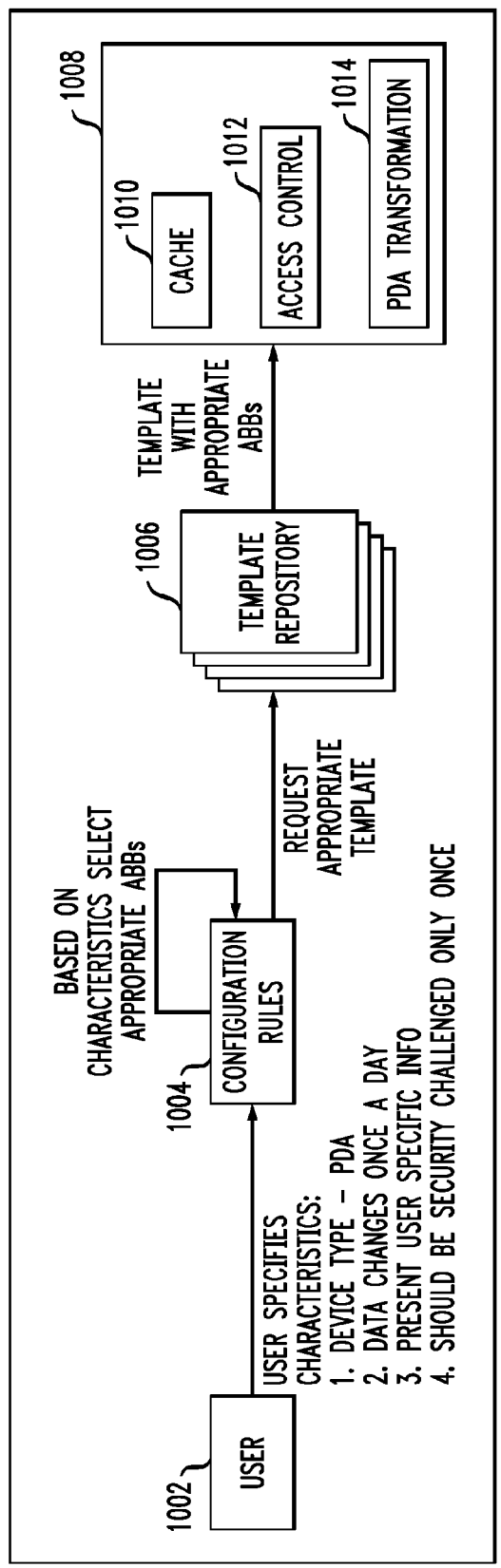
FIG. 10 is a block diagram illustrating an exemplary system that can execute an exemplary method for creating a dynamic template, according to another aspect of the invention.

FIG. 10 is a block diagram illustrating an exemplary system that can execute an exemplary method for creating a dynamic template, according to another aspect of the invention. In dynamic template creation, a user 1002 will select certain characteristics and the system will determine the appropriate rules and select the relevant and/or appropriate ABBs at run time from a template repository 1006 For example, a user 1002 may specify two characteristics, such as "data are static" (that is, data do not change during an interaction), implying a caching ABB will be needed, and that the user should not be challenged multiple times, which would imply use of a proper security token mechanism, and other measures. These characteristics will be used during the run time to configure appropriate ABBs In FIG. 10, by way of example, a user 1002 specifies that data changes once a day, and based on this input the configuration rules 1004 choose a caching ABB. Similarly, since the user has specified that the requesting application is PDA-based, the template gets populated with PDA transformation ABB. The request for an appropriate template is directed to a template repository 1006, which includes the template with the appropriate ABBs 1008. For completeness, an example of an appropriate template is depicted in FIG. 10 comprising components or ABBs including cache 1010, access control 1012, and PDA transformation 1014. If the user does not need to be challenged multiple times, then we would need an appropriate access control mechanism that would use, say, a security token.

Based on the configuration framework described above, an architectural pattern enablement framework can be created. The fine-grained ABBs will provide the flexibility to create architectural patterns based on different service scenarios.

Described below, we designate an exemplary set of architectural decisions to support services enablement of identification and management of ABBs for the presentation module in a software solution. These architectural decisions document assessments about various aspects of the architecture including the structure of the system, the provision and allocation of functions, the contextual fitness of the system, and adherence to standards. Enabling the architecture design services through defining architectural decisions for the presentation module in a solution is yet another aspect of the invention.

When designing an exemplary consumer module, an architect needs to make critical architectural decisions toward an SOA solution This section describes an exemplary set of 16 typical architectural decisions regarding the Consumer module in a standard format, as summarized in Table 1. It should be noted that a specific application may require further architectural decisions. The descriptions here are used as templates and examples, and will enable a skilled artisan to extract further decision points.

TABLE 1

Exemplary architectural decisions for the Consumer module.

| Architectural Decisions | ID |
| --- | --- |
| Identification of ABBs | AD-01 |
| Connections among ABBs within the Consumer module | AD-02 |
| Configuration of the interfaces of ABBs | AD-03 |
| Interaction patterns for ABBs with other modules | AD-04 |
| Stateful vs. stateless ABBs | AD-05 |
| Granularity enablement of state management | AD-06 |
| Federated vs. individual state management | AD-07 |
| Enablement of access control on ABBs | AD-08 |
| Workflow performance management | AD-09 |
| Exception handling management | AD-10 |
| Consumer types | AD-11 |
| Presentation models (MVC model, portlet technique, and Ajax technique) | AD-12 |
| Message exchange for ABB interactions | AD-13 |
| Message presentation transformation strategies | AD-14 |
| Connectivity to the Workflow Process module | AD-15 |
| Life cycle management of ABBs | AD-16 |

Architectural Decision 1: Identification of ABBs

| | | | |
| --- | --- | --- | --- |
| Design Decision | Identification of ABBs | Id. | AD-01 |
| Issue or Problem Statement | For each type of ABB, an architect needs to decide: Whether such a type of ABB is needed in the system architecture? For example, "Do I need a separate access control ABB?" How many instances of each type of ABB are needed? For example, "Do I need to identify one or more access control ABBs?" In other words, this is a decision on yes/no and how many. | | |
| Assumptions | ABBs are used to construct the Consumer module. | | |
| Motivation | Major motivational factors for identifying ABBs are: for enhancing flexibility, extensibility, maintainability, scalability, variability, and reusability of the Consumer module. | | |
| Alternatives | 1. ABB-based architecture Identify instances of each of the 8 types of ABBs. 2. Integrated architecture Identify more integrated components that combine multiple ABBs in one unit | | |
| Decision | If the Consumer module is expected to be highly simple and straightforward with tight budget and time frame requirements, a more | | |

TABLE 1-continued

Exemplary architectural decisions for the Consumer module.

|  |  |
|---|---|
|  | integrated solution (Alternative #2) that combines multiple ABBs in one component is an alternative. Otherwise, an ABB-based architecture (Alternative #1) should be adopted.<br>For each type of ABB, the architect needs to make decisions based upon the following criteria:<br>Consumer: If the module is required to provide interfaces to users (either programs or individuals), the consumer ABB is needed Each expected type of user requires a separate consumer ABB For example, PDA or wireless phone-based users, desktop-based uses, and programs each require a dedicated consumer ABB<br>Presentation (view): If the module is expected to receive input via a Query from a consumer and provide or display a response to a consumer, the presentation (view) ABB is needed. If multiple consumer ABB instances are identified, multiple presentation (view) ABB instances are needed<br>Presentation controller: If the module needs to manage the navigation logic for consumer interactions, a presentation controller ABB is needed. In one embodiment of the invention, it is recommended that this ABB is always identified.<br>Consumer profile: If customers are associated with specific information to be used by the presentation controller for navigation and content presentation purposes, a consumer profile ABB is needed.<br>Access control: If authentication and/or authorization capabilities need to be provided for the presentation controller to allow or prevent what content can he presented to the consumers, an access control ABB is needed.<br>Format transformation: If there is a need for translation of Query content format required by other modules, or a need to convert content returned from other modules to a consumer response format, a format transformation ABB is needed.<br>Configuration rule: If rules are needed to indicate how the identified ABBs should be configured based on consumer request scenarios, a configuration rule ABB is needed. In one embodiment of the invention, if the ABBs are coarse-grained, this ABB is optional, as it may reduce flexibility. On the other hand, if ABBs are fine-grained, a dedicated configuration rule will enhance flexibility.<br>Cache: If there is a need to temporarily store consumer interaction-related data to enhance presentation performance, a cache ABB is needed |
| Justification | Major advantages of identifying ABBs include:<br>Separating concerns between data and presentation allows one to separate workflow logic and user interface<br>Associating different concerns with different ABBs enhances flexibility, scalability, maintainability, extensibility, variability, configurability, and testability Different ABBs can be independently developed and tested before integrating with each other<br>Associating different concerns with different ABBs based on Web services standards (for example, WSRF) also allow run-time dynamic selection and integration of various ABBs based upon workflow, system status, and predefined user preferences.<br>Minimizes code development efforts due to requirements changes in the Consumer module.<br>Allows for both dynamic and static configuration of ABBs.<br>Allows for maintaining a uniform interface of various ABBs in the Consumer module, so that they can easily communicate with each other. Moreover, uniform ABBs can easily interact with other modules. |
| Implications | This is a critical decision and the first decision for the architectural design of the Consumer module of any large-scale SOA application. Unless there are sound technical or workflow reasons, the ABB-based model should be adopted. |
| Related Decisions | Connections among ABBs within the Consumer module (AD-02)<br>Configuration of the interfaces of ABBs (AD-03) |

Architectural Decision 2: Connections among ABBs within the Consumer module

| | | | |
|---|---|---|---|
| Design Decision | Connections among ABBs | ID. | AD-02 |
| Issue or Problem Statement | How to specify the connections among identified ABBs? For example, do they have some connectivity patterns? Will they link to each other? Will they be linked in sequences? What are their relationships? | | |
| Assumptions | ABBs have already been identified. | | |
| Motivation | The identified ABBs need to be properly connected with each other, so that they can collaborate appropriately. | | |
| Alternatives | 1. Stochastic interaction patterns<br>Identified ABBs build random interaction patterns with each other based upon specific workflow logic in the development process. | | |

TABLE 1-continued

Exemplary architectural decisions for the Consumer module.

| | |
|---|---|
| Decision | 2. Predefined interaction patterns<br>FIG. 1 depicts a recommended interaction pattern for various ABBs in the Consumer module to connect with each other.<br>FIG. 1 depicts a recommended connectivity diagram among various ABBs identified:<br>A consumer and a presentation (view) need to interact with each other.<br>Each presentation (view), consumer profile, access control, format transformation, configuration file, and cache needs to interact with and under the control of the presentation controller.<br>A cache ABB needs to interact with a corresponding consumer profile ABB.<br>Identified presentation (view), consumer profile, access control, format transformation, configuration file, and cache ABBs are not recommended to directly interact with each other. |
| Justification | The recommended, loosely coupled connection pattern supports various presentation scenarios that are stochastic, dynamic, fluctuant, location-based, and application-specific. |
| Implications | Unless There are sound technical or workflow reasons, the connectivity model depicted in FIG. 1 should be adopted<br>More connection patterns may be configured if needed. |
| Related Decisions | Identification of ABBs (AD-01)<br>Configuration of the interfaces of ABBs (AD-03) |

Architectural Decision 3: Configuration of the interfaces of ABBs

| | |
|---|---|
| Issue or Problem Statement | How to configure and decide internal structures and operations of each identified ABB? |
| Assumptions | ABBs have already been identified. |
| Motivation | The architect needs to decide internal structures (for example, attributes) and exposed operations of each identified ABB. |
| Alternatives | |
| Decision | The architect needs to decide attributes, operations, and states of each ABB, according to the WSRF-based ABB definitions described herein. |
| Justification | Attributes can indicate the state of a running ABB instance, which can be used to monitor and manage ABBs at run time Operations indicate the functionalities of ABBs. |
| Implications | For each ABB, attributes and operations should be defined in a standardized manner (for example, in WSRF). |
| Derived requirements | Identification of ABBs (AD-01)<br>Connections among ABBs within the Consumer module (AD-02) |
| Related Decisions | Identification of ABBs (AD-01) |

Architectural Decision 4: Interaction patterns for ABBs with other modules

| | | | |
|---|---|---|---|
| Design Decision | Interaction patterns for ABBs with other modules | Id. | AD-04 |
| Issue or Problem Statement | Will the identified ABBs connect with other modules? Which ones will connect to other modules? | | |
| Assumptions | ABBs have already been identified. | | |
| Motivation | ABBs in the Consumer module need to connect to the ABBs in other modules. We should identify and specify their standard interaction patterns. | | |
| Alternatives | 1. Stochastic interaction patterns<br>Identified ABBs build random interaction patterns with other modules based upon specific workflow logic in the development process.<br>2. Predefined interaction patterns<br>FIG. 1 depicts a recommended interaction pattern for various ABBs to connect to other modules, according to one embodiment of the invention:<br>A presentation control ABB needs to interact with other modules (for example, Workflow Process module, Service module, and Governance module).<br>A format transformation ABB needs to interact with at least one other module (for example, Integration module).<br>An access control ABB needs to interact with at least one other module (for example, Quality of Services (QoS) module).<br>A cache ABB needs to interact with at least one other module (for example, Data module)<br>A consumer profile ABB needs to interact with at least one other module (for example, Data module). | | |
| Decision | FIG. 1 depicts a recommended interaction pattern for various ABBs to connect to other modules:<br>A presentation control ABB needs to interact with other modules (for example, Workflow Process module, Service module, and | | |

TABLE 1-continued

Exemplary architectural decisions for the Consumer module.

|  |  |
|---|---|
|  | Governance module) |
|  | A format transformation ABB needs to interact with at least one |
|  | other module (for example, Integration module) |
|  | An access control ABB needs to interact with at least one other |
|  | module (for example, Quality of Services (QoS) module). |
|  | A cache ABB needs to interact with at least one other module (for |
|  | example, Data module). |
|  | A consumer profile ABB needs to interact with at least one other |
|  | module (for example, Data module). |
| Justification | The recommended interaction pattern supports stochastic, fluctuant |
|  | presentation scenarios. Meanwhile, the recommended predefined |
|  | interaction pattern enables a loosely coupled integration relationships |
|  | between the Consumer module and other modules in an SOA solution. |
| Implications | Unless there are sound technical or workflow reasons, the |
|  | recommended predefined interaction patterns depicted in FIG. 1 should |
|  | be adopted. |
| Related | Identification of ABBs (AD-01) |
| Decisions | Connections among ABBs within the Consumer module (AD-02) |
|  | Configuration of the interfaces of ABBs (AD-03) |

Architectural Decision 5: Stateful vs. stateless ABBs

|  |  |
|---|---|
| Design Decision | Stateful vs. stateless ABBs     Id.     AD-05 |
| Issue or Problem Statement | Based upon the assumptions below, an architect needs to decide whether state information needs to be captured and tracked (stateful versus stateless) in ABBs? |
| Assumptions | Due to the world-wide competition, an Internet service needs to serve various types of consumers and provide personalized services. In addition, instead of providing simple, isolated transactions, such a modern service needs to maintain persistent information (for example, user historical data) to better serve consumers. Furthermore, many such services are comprehensive enough to require a series of related interactions between a consumer and the service; thus, conversational information needs to be kept and tracked during a transaction. ABBs have already been identified, and their relationships and interaction patterns have been specified. |
| Motivation | The motivations for this problem is five-fold: The Consumer module should maintain a stateful session for a specific consumer in the whole period of a process. A consumer may expect that the system remembers his/her preferences and historical data (for example, previous activities) to better serve him/her in the future A consumer may expect to input his/her preferences only once, while the system can remember them whenever he/she signs in and provides him/her personalized services accordingly. The Consumer module needs to interact with other modules, so that stateful information about their interactions and communications is necessary to keep persistent. The Consumer module should track the status of running instances of ABBs based upon some predefined requirements (for example, bandwidth) to check their availabilities. This will enable management of the life-cycles of the created ABB instances. |
| Alternatives | 1. Stateless Consumer module If the Consumer module (1) responds to requests from a consumer without regard to any previous information (including requests, preferences, and historical information) from the same consumer, or (2) does not capture and track interactions among ABBs, it is considered as a stateless Consumer module This option is easy to implement as no additional mechanism is needed. 2. Stateful Consumer module If the Consumer module (1) remembers consumer information (for example, personal information and preferences) and keeps track of consumer activities (for example, historical information), and (2) captures and tracks interactions among ABBs, it is considered a stateful Consumer module. This option requires additional mechanisms (including code and resources). |
| Decision | If the system intends to (1) provide simple read-only services (for example, catalog service) with no user information (for example, preferences and historical activities) needed to remember, or (2) provide one-time interactions (for example, the system does not remember a user, and the user always logs in the system as a visitor or new user), a stateless alternative #1 may suffice. If the system provides comprehensive workflow services requiring multi-step interactions or if the system provides personalized services for multiple entries, a stateful alternative #2 is needed. |

TABLE 1-continued

Exemplary architectural decisions for the Consumer module.

| | |
|---|---|
| Justification | Entity services typically possess a level of sophistication to provide their consumers personalized and individualized services. This in many cases indicates that the system needs to remember user input preferences and historical activities. |
| Implications | A stateful Consumer module requires more coding and additional processing resources. Therefore, it typically has a definite impact on the performance of the system (for example, cost, configurability and re-configurability of ABBs). Furthermore, it takes longer time to develop the mechanism and the application. Moreover, it may affect the scalability of the system Therefore, it should be used when it is necessary. |
| Related Decisions | Granularity enablement of state management (AD-06) Federated vs. individual state management (AD-07) |

Architectural Decision 6: Granularity enablement of state management

| | | | |
|---|---|---|---|
| Design Decision | Granularity enablement of state management | Id. | AD-06 |
| Issue or Problem Statement | If we decide to construct a stateful Consumer module, to which granularity do we need to capture and track state information? For example, do we need to log all interactions and activities in the Consumer module? What kind of consumer preferences will be captured and stored in the module? | | |
| Assumptions | It has been decided that a stateful Consumer module is required. | | |
| Motivation | Different granularities of state management imply different performance impacts and governance levels | | |
| Alternatives | 1. Predefined state management<br>1.1. Coarse-grained state management<br>High-level state information about interactions of ABBs are captured and tracked. Coarse-grained consumer preferences are configurable<br>1.2. Fine grained state management<br>Fine-grained state information about interactions of ABBs and consumer historical activities are captured and tracked. Consumer preferences are captured and stored to provide personalized services to consumers. In addition, consumer preferences are reconfigurable<br>2. Reconfigurable state management<br>Administrators can dynamically adjust the granularity levels of state management, based upon requirements of a pertinent entity, including cost and presentation performance.<br>3. Hybrid state management<br>Take a hybrid granularity level of state management as well as its configurability, based upon requirements of a pertinent entity, including cost, development time and efforts, resources, and presentation performance. | | |
| Decision | For a specific application, the architect should take into consideration all related requirements or a pertinent entity, as well as system requirements and decide an application-specific hybrid state management mechanism. | | |
| Justification | Coarse-grained state management (Alternative #1.1) is cheaper to implement and takes less resources. It also has less effect on presentation performance.<br>Fine-grained state management (Alternative #1.2), on the other hand, provides comprehensive state information and allows various levels of control and management over the Consumer module, as well as various levels of presentation services to customers. However, the tradeoff is not only the expense to implement and maintain, but also that it requires a significant amount of resources at run time, and thus it may affect presentation performance.<br>Reconfigurable state management (Alternative #2) offers re-configurability, flexibility, and extensibility to both the Consumer module and customers However, it requires significant development efforts.<br>Hybrid state management (Alternative #3) takes into consideration of various system requirements (for example, flexibility, extensibility, configurability, re-configurability, maintainability, and performance) and requirements of a pertinent entity (for example, cost, development time and efforts, and resources) and leads to an application-specific solution. | | |
| Implications | The architect should gather all related requirements of a pertinent entity and system requirements before making a decision on the granularity of state management. | | |
| Related Decisions | Stateful vs stateless ABBs (AD-5)<br>Federated vs. individual state management (AD-07) | | |

Architectural Decision 7: Federated vs. individual state management

| | | | |
|---|---|---|---|
| Design Decision | Federated vs. individual state management | AD ID | AD-07 |

TABLE 1-continued

Exemplary architectural decisions for the Consumer module.

| | |
|---|---|
| Issue or Problem Statement | Will the state information be associated with individual ABBs or will we use a federated state management mechanism? Who will have access to logged states? |
| Assumptions | ABBs have been identified; stateful Consumer module strategy has been adopted; granularity of state management has been decided. |
| Motivation | Decide whether each ABB needs to capture and store state information, or whether a centralized state management unit is needed |
| Alternatives | 1. Federated state management<br>The Consumer module establishes a centralized solution, with a dedicated state management control unit and a centralized state repository. All state information is captured by the control unit and stored into the centralized state repository. Any state information needed is retrieved through the control unit from the centralized repository. Typically, this centralized state management control unit and associated state repository can be part of the presentation control ABB, either integrated with the ABB or becoming a self-controlled unit.<br>2. Individual state management<br>Each ABB needs to implement a state management control unit and include a state repository. In other words, each ABB encapsulates a state management facility.<br>3. Hybrid solution<br>Each ABB encapsulates certain level of state management facility, while the Consumer module maintains a centralized state management control unit associated with a dedicated state repository to manage the interaction activities among the ABB instances within the Control module, as well as to the other modules. |
| Decision | An application-specific hybrid solution (Alternative #3) is recommended. |
| Justification | A centralized state management solution (Alternative #1) is probably easier to implement and management. However, it has to undergo changes when there are any changes of ABBs controlled within the Consumer module. In addition, its reusability is limited. Moreover, the centralized state management control unit and its state repository may become a performance bottleneck under certain circumstances.<br>An individual state management solution (Alternative #2) integrates state management into each ABB. State management (including capturing and retrieval) thus can be distributed to individual ABBs; presentation performance is less effected. However, the development of each ABB thus requires more efforts. In addition, how to share state information among different types of ABBs needs to be solved. Typically, a common schema of how state information can be captured and stored by individual ABBs needs to be defined<br>The hybrid solution (Alternative #3) requires the architect to balance between the Alternative #1 and Alternative #2, taking into consideration of various system requirements (for example, flexibility, extensibility, configurability, re-configurability, maintainability, and performance) and requirements of a pertinent entity (for example, cost, development time and efforts, and resources). |
| Implications | The architect should gather all related requirements of a pertinent entity and system requirements before making a decision on the state management implementation solution.<br>Furthermore, the granularity level of state management decided earlier (in AD-05) also influences the decision. For example, if it has been decided that a very fine-grained state management is required, more individually controlled state management may be more appropriate, since otherwise the centralized solution may cause a significant bottleneck during peak interaction time. |
| Related Decisions | Stateful vs. stateless ABBs (AD-5)<br>Granularity enablement of state management (AD-06) |

Architectural Decision 8: Enablement of access control on ABBs

| | | | |
|---|---|---|---|
| Design Decision | Enablement of access control on ABBs | Id. | AD-08 |
| Issue or Problem Statement | Who, When, How much?<br>Who can access each ABB?<br>When can an ABB be accessed?<br>What kind of information (for example, how much content, partial or full) can be shared by an ABB?<br>Who can change an ABB? | | |
| Assumptions | ABBs have been identified. | | |
| Motivation | On one side, one may want to have access to another ABB. On the other side, one ABB may want to protect some information from access. | | |
| Alternatives | 1. Associate each ABB with an access control ABB instance<br>Each ABB is associated with an access control ABB instance, which decides, for example, which ABB can access it, what kind of information can be shared by whom.<br>2. One access control ABB for all ABBs<br>Only one access control ABB is established to specify the access privileges and policies for all ABBs.<br>3. A hybrid approach | | |

TABLE 1-continued

Exemplary architectural decisions for the Consumer module.

| | |
|---|---|
| Decision | One access control ABB is established to specify overall access privileges and policies. If a specific ABB requires finer-grained access control, it can be associated with a dedicated access control ABB. If control privileges are comprehensive and fine-grained, each ABB can be associated with a dedicated access control ABB. Otherwise, one shared access control ABB can be used. An ABB can be defined as either public, private, or partially public with configurable expose levels, or even configurable expose levels to different users (for example, privileges) |
| Justification | Proper access control strategy provides flexible and powerful security and privacy control without significant performance degradation. |
| Implications | Any level of granularity can be realized on access control, based upon requirements of a pertinent entity. |
| Related Decisions | Identification of ABBs (AD-01) |

Architectural Decision 9: Workflow performance management

| | | | |
|---|---|---|---|
| Design Decision | Workflow performance management | Id. | AD-09 |
| Issue or Problem Statement | To which level do we need to conduct workflow performance monitoring and management? What kinds of information need to be monitored? Do we need to track all activities, including query data from consumers and responses from back-end systems? | | |
| Assumptions | ABBs have been identified and configured. | | |
| Motivation | We should manage workflow performance of the Consumer module. | | |
| Alternatives | Various levels of workflow performance management can be adopted, such as: Status of ABB instances, Alignment of ABB patterns with goals and requirements of a pertinent entity, Alignment with workflow Key Performance Indicators (KPIs), such as cost and time, Alignment with workflow processes, services, and people, Impact analysis and dependency analysis | | |
| Decision | The architect needs to make decisions on what levels of workflow performance management are needed. For example, which types of above workflow performance management are needed? | | |
| Justification | Different presentation scenarios may require different levels of workflow performance management. All above alternatives should be considered and decided. | | |
| Implications | The architect needs to examine the above alternatives and make decisions. | | |
| Related Decisions | Identification of ABBs (AD-01) | | |

Architectural Decision 10: Exception handling management

| | | | |
|---|---|---|---|
| Design Decision | Exception handling management | Id. | AD-10 |
| Issue or Problem Statement | Which ABB instance creates the exception? What kind of exception is it? When does the exception occur? How to address and handle the exception? What are the implications and impacts of the exception? | | |
| Assumptions | ABBs have been identified. | | |
| Motivation | They system should have a powerful exception handling mechanism. When exceptions occur in the Consumer module, they should be caught and blocked, by the exception handling mechanism, from propagating to other modules or consumers From a user's perspective, if an exception happens, he/she should only be notified that the system encounters some issues without seeing system-internal information (for example, which function meets what exception). In one aspect of the invention, the fundamental rule is to reduce and minimize cascading effect of exceptions. | | |
| Alternatives | 1. No exception handling mechanism No specific exception handling mechanism is set up. 2. Comprehensive exception handling mechanism. A comprehensive exception handling mechanism is set up. | | |
| Decision | A comprehensive exception handling mechanism needs to be decided and constructed early in the stage. | | |
| Justification | A proper exception handling mechanism will greatly enhance the reliability of the system. | | |
| Implications | We need to identify possible exception types and handling mechanisms. | | |
| Related Decisions | Identification of ABBs (AD-01) | | |

TABLE 1-continued

Exemplary architectural decisions for the Consumer module.

Architectural Decision 11: Consumer types

| | | | |
|---|---|---|---|
| Design Decision | Consumer types | Id. | AD-11 |
| Issue or Problem Statement | What types of consumers will the consumer module deal with, an individual or a program? | | |
| Assumptions | The Consumer module needs to receive requests and response with answers. | | |
| Motivation | We need to first decide the type of consumers of the system, so that we can decide what kinds of presentation information we need to generate and prepare. | | |
| Alternatives | A consumer can be:<br>A program, or<br>An individual. | | |
| Decision | In general, regarding B2B type interactions, we can assume a consumer is a program; regarding Web-based Internet services portals, we can assume that a consumer is an individual user. | | |
| Justification | In a business-to-business (B2B) type interaction, a consumer is normally a workflow process that intends to request the system for services. Responses are consumed by the workflow process to conduct its predefined goals of a pertinent. Therefore, if the system intends to be used by a B2B process, we can assume that a consumer is a program. If the system intends to be a Web-based services portal, the users are usually individual users who access the portal through a graphical user interface (GUI) | | |
| Implications | If a consumer is a program, we normally need to produce machine-understandable (for example, XML-based) presentation views. Otherwise, if a consumer is an individual user, we need to consider building a GUI for the system. | | |
| Related Decisions | Identification of ABBs (AD-01) | | |

Architectural Decision 12: Presentation models (MVC model, portlet technique, and Ajax technique)

| | | | |
|---|---|---|---|
| Design Decision | Presentation models (MVC model, portlet technique, and Ajax technique) | Id. | AD-12 |
| Issue or Problem Statement | The architect needs to decide whether to adopt presentation models and techniques, such as Model-View-Controller (MVC) model, portlet technique, and Ajax technique. | | |
| Assumptions | Presentation (view) ABBs have been identified. | | |
| Motivation | There exist several popular models and techniques dedicated for presentations. Adopting appropriate techniques can enhance flexibility and extensibility of the Consumer module without developing everything scratch. | | |
| Alternatives | 1. MVC model<br>MVC model (pattern) stands for Model-View-Controller, which intends to guide the establishment of a reusable, modularized presentation framework. The MVC model decouples domain (model) objects from its presentations (views) to enable reusability of domain objects. It also decouples workflow logic (data) from its presentation (views).<br>2. Portlet technique<br>In short, a portlet represents an independent window on a portal. Each portlet directly connects to the back-end systems to represent an interface to serve specific workflow requirements. For example, a portal can have many portlets, such as one for a personalized e-mail browser, one for company-wide news, and one for task processing. Portlets can communicate with each other through message passing. In short, the portlet technique provides a modularized layout framework to define a presentation interface.<br>3. Ajax technique<br>Ajax technique is a non-intrusive content refreshing architecture for Web-based presentations. In general, the content of a Web page can be refreshed often. The Ajax technique intends to offer users smooth experiences when the content updates. Embedding synchronous Java scripts and XML tags, its main idea is to send to the server a hypertext transfer protocol (HTTP) request that includes XML contents, so that the server side parses the HTTP request content and retrieves information from the back-end systems. Once XML content is returned, it will be extracted and reflected in the Web page without refreshing (reloading) the entire page. | | |
| Decision | Always try to adopt and apply the MVC pattern to enhance reusability and flexibility of the Consumer module.<br>Try to adopt the portlet technique to organize various workflow logics in a modularized manner in one presentation interface.<br>Try to adopt the Ajax technique to enable a light-weight non-intrusive content refreshing to offer smooth browse experiences. | | |

TABLE 1-continued

Exemplary architectural decisions for the Consumer module.

| | |
|---|---|
| Justification | These are known and proven models and techniques that facilitate the design and development of presentation services |
| Implications | Try to use the known techniques |
| Related Decisions | Identification of ABBs (AD-01) |

Architectural Decision 13: Message exchange for ABB interactions

| | |
|---|---|
| Design Decision | Message exchange for ABB interactions    AD ID    AD-13 |
| Issue or Problem Statement | Different types of ABBs within the Consumer module or across different modules may adopt different internal schemas for data descriptions. Thus, in order to enable communications and interactions between different types of ABBs, proper message exchange mechanisms are needed. |
| Assumptions | The interaction patterns between ABBs within the Consumer module and across with other modules have been identified and decided. |
| Motivation | Flexible and extensible mechanisms are needed for message exchange between ABBs.<br>Further enhancements on performance are needed regarding message communications. |
| Alternatives | 1. Fixed schema<br>A fixed schema is adopted and followed by all ABBs across all modules for data presentations.<br>2. End-to-end message exchange<br>A dedicated message exchange method is implemented between two types of ABBs (either within the Consumer module or across various modules in an SOA solution) if necessary.<br>3. Message exchange adapter<br>A generic message exchange adapter mechanism intends to enable and facilitate message communications between at least two ABBs (either within the Consumer module or across various modules in an SOA solution) by translating between at least two message schemas. An instance of the adapter will be created as a plug-in for a pair of ABBs requiring interactions. It is the adapter's responsibility to realize smooth message exchange; the two ABBs are not aware of it. |
| Decision Justification | A message exchange adapter (Alternative #3) mechanism is recommended.<br>The fixed schema strategy (Alternative #1) is easy to realize and requires only one-time implementation at the beginning. However, it is not easy, and sometimes may be impractical, to define a fixed schema suitable to all ABBs in all nine modules in an SOA solution. Furthermore, this alternative is inflexible. When one type of ABB requires changes in its data presentation schema, the fixed schema needs to be changed accordingly. Therefore, its maintainability is also limited.<br>The end-to-end message exchange strategy (Alternative #2) builds transformation mechanism when necessary. It may include the limitation of low reusability.<br>The message exchange adapter strategy (Alternative #3) provides a highly reusable and flexible technique to enable and facilitate message communications and interactions between any pair of ABBs. In addition, message transformation implementations are hidden inside of adapters. Thus, ABBs do not need to consider or carry any code regarding message transformation. As a result, ABBs may become more reusable. |
| Implications | For a pair of ABBs that need message communication, a message exchange adapter needs to be extended from the generic message exchange adapter. |
| Related Decisions | Connectivity to the Workflow Process module (AD-15) |

Architectural Decision 14: Presentation transformation

| | |
|---|---|
| Design Decision | Presentation transformation    AD ID    AD-14 |
| Issue or Problem Statement | Proper presentation translation strategies are needed for pre-processing and post-processing. Input data from consumers may need to be transformed into internal queries; response data from other modules may need to be transformed into output data for presentation.<br>Input queries may need to be aggregated before sending to another module for further processing; results may need to be aggregated before returning to consumers. |
| Assumptions | The interaction patterns between ABBs within the Consumer module and across with other modules have been identified and decided. |
| Motivation | A flexible and extensible strategy is needed for input pre-processing and output post-processing<br>Further performance enhancements are needed regarding message communications. |
| Alternatives | 1. Propagate without transformation<br>Consumer input is propagated directly to other modules without pre-processing; responses from other modules are propagated to the consumers without post-processing. In other words, the Consumer module merely forwards consumer input and system responses without processing.<br>2. Presentation pre- and post-processing |

TABLE 1-continued

Exemplary architectural decisions for the Consumer module.

|  |  |
|---|---|
|  | Consumer input data are translated into system-internal queries before passing to other modules. Responses from other modules are translated into consumer-understandable presentation formats before returning them to consumers In general, two alternative strategies are available to realize presentation pre-processing and post-processing: end-to-end translation and translation adapter.<br>2.1 End-to-end translation<br>A dedicated presentation translation method is implemented for a specific type of consumers.<br>2.2 Translation adapter<br>A generic presentation translation adapter mechanism intends to enable and facilitate pre-processing and post-processing fat any consumers. An instance of the adapter will be created as a plug-in for a specific type of consumer.<br>3. Message aggregation<br>Aggregate queries (if there are multiple) before sending to other modules for further processing, and aggregate results (if there are multiple) before returning to consumers. |
| Decision | A presentation translation adapter (Alternative #2.2) mechanism is recommended. An adapter should also include ability of message aggregation (Alternative #3). |
| Justification | Propagation without processing (Alternative #1) is easy to realize, since the Consumer module acts only as an intermediary for information passing. However, this alternative requires other modules and consumers conduct more work. Since consumer input is not translated, every other module receiving the propagated consumer input may likely have to interpret and translate the information by itself. Since responses from other modules are not translated, consumers will likely implement a translation mechanism for each module. This strategy, in general, is neither flexible nor extensible.<br>The end-to-end presentation translation strategy (Alternative #2 1) builds a translation mechanism for each specific type of consumer. Its limitation is that the reusability of the consumer-specific translation mechanisms is low.<br>The presentation translation adapter strategy (Alternative #2 2) provides a highly reusable and flexible technique to enable and facilitate message communications and interactions for any types of consumers. In addition, presentation translation implementations are hidden inside of adapters. Thus, both consumers and other modules in an SOA solution do not need to consider or carry any code regarding presentation translation.<br>Automatically aggregating messages enhances message communication performance by reducing the number of messages that need to be sent Integrating automatic message aggregation facility inside of a presentation translation adapter further enhances presentation performance, since message translation and message aggregation are two things that always need to be handled. |
| Implications | For a type of consumer, a presentation translation adapter needs to be derived from the generic translation adapter<br>The automatic message aggregation facility can be implemented as part of the generic presentation translation adapter. Therefore, any extended adapters automatically inherit the facility. |
| Related Decisions | Connectivity to the Workflow Process module (AD-15) |

| Architectural Decision 15: Connectivity to the Workflow Process module | |
|---|---|
| Design Decision | Connectivity to the Workflow Process module     AD ID     AD-15 |
| Issue of Problem Statement | How to enable the connectivity between the Consumer module and the Workflow Process module? |
| Assumptions | Interactions with the Workflow Process module should be a mix of synchronous and asynchronous communications. |
| Motivation | We need to establish a connectivity pattern between the Consumer module and the Workflow Process module to enable consistent and manageable connectivity. |
| Alternatives | 1. Direct connectivity<br>ABBs in the Consumer module directly communicate with the ABBs in the Workflow Process module through message passing.<br>2. Through the Integration module<br>The Consumer module does not directly communicate with the Workflow Process module. Instead, all communications between ABBs from the two modules are centralized at a common intermediary —the Integration module. The Integration module receives all messages, and routes them to the proper ABBs abiding by some predefined rules and policies. |
| Decision | We recommend that all communications between the Consumer module and the Workflow Process module go through the Integration module (Alternative #2). As a matter of fact, we recommend any cross-module message communications go through the Integration module. |
| Justification | Direct connectivity (Alternative #1) limits the reusability of both the Consumer module and the Workflow Process module. When a Consumer module communicates with another Workflow Process module, their connectivity has to be re-developed and rebuilt. |

TABLE 1-continued

Exemplary architectural decisions for the Consumer module.

| | |
|---|---|
| | Communication through the Integration module provides a centralized strategy for management of cross-module communications. Any communication methods can be implemented in the Integration module once and reused by different ABB communications. |
| Implications | All ABBs in the Consumer module need to be enabled for working with the Integration module. |
| Related Decisions | Message exchange for ABB interactions (AD-13) |

Architectural Decision 16: Life-cycle management of ABBs

| | | | |
|---|---|---|---|
| Design Decision | Life-cycle management of ABBs | AD ID | AD-16 |
| Issue of Problem Statement | How to manage the life-cycle of an ABB instance? | | |
| Assumptions | ABBs have been identified and configured. | | |
| Motivation | We need to manage the life-cycle of an ABB instance, including items such as, for example, its status and health. | | |
| Alternatives | 1. No lifecycle management of ABBs<br>The simplest way is to have no lifecycle management of ABBs.<br>2. Lifecycle management of ABBs<br>An ABB may have its life-cycle, from the time it is created until the time it is destroyed. | | |
| Decision | We recommend establishing life-cycles for ABBs and managing their status during their life-cycles. | | |
| Justification | Managing life-cycles of ABBs can help to monitor their status, health, and availability, so that corresponding methods can be adopted accordingly. For example, if an ABB is not responding, a new ABB may need to be created and replace the previous one. | | |
| Implications | We need to define a life-cycle for an ABB. | | |
| Related Decisions | Identification of ABBs (AD-01) | | |

Figure 11:
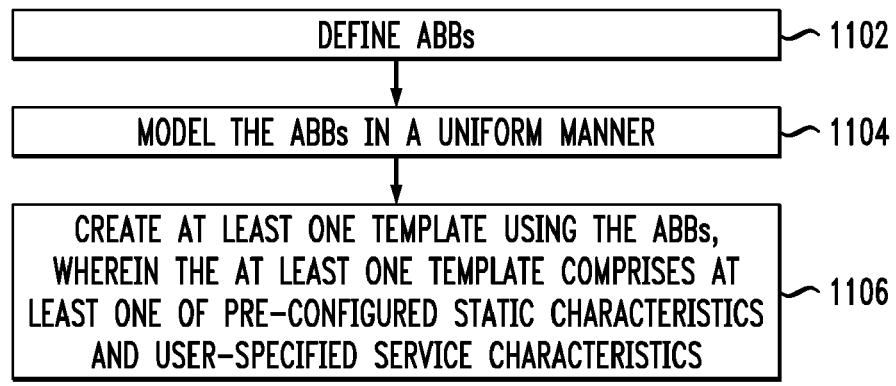
FIG. 11 is a flow diagram illustrating an exemplary method for representing and configuring flexible and extensible presentation patterns based on fine-grained architectural building blocks (ABBs), according to one aspect of the invention.

FIG. 11 shows a flow diagram illustrating a method for representing and configuring flexible and extensible presentation patterns based on fine-grained architectural building blocks (ABBs), according to one embodiment of the invention. Step 1102 includes defining ABBs. Step 1104 includes modeling the ABBs in a uniform manner. Step 1106 includes creating at least one template using the ABBs, wherein the at least one template includes at least one of pre-configured static characteristics and user-specified service characteristics.

Defining ABBs 1102 may include, by way of example and not limitation, defining the following ABBs: consumer, presentation (view), presentation controller, consumer profile, access control, format transformation, configuration rule, and cache Defining ABBs 1102 may further include dividing the responsibilities of presentation module into sub-responsibility areas Sub-responsibility areas may, for example, have a logical grouping of related cohesive functions, and the sub-responsibility areas also may be treated as ABBs. Also, an ABB definition may include defining attributes that are associated with an ABB. Attributes may, as an example, include at least one of an identifier (ID) attribute (for example, ABB Id), a type attribute (for example, ABB Type), a state attribute (for example, ABB State), a protocol attribute (for example, ABB Protocol), and an input type and output type attribute (for example, ABB Input Type and Output Type)

Modeling ABBs in a uniform manner 1104 may include using a unified framework to model each of the ABBS. The unified framework may facilitate development of unified interface descriptions for each ABB, thus allowing ABBs to be discovered and composed in a standardized manner as the interface descriptions are based on industry standards. Modeling ABBs in a uniform manner 1104 may also include defining operations for ABBs including, as a way of example and not limitation, at least one of an identification operation (for example, getABBId), a name operation (for example, getABBName), a layer operation (for example, getABBLayer), a state operation (for example, getABBState), a protocol operation (for example getABBProtocol), an input data type operation (for example, getABBInputDataType), an output data type operation (for example, getABBOutputDataType), an input and/or output type operation (for example, getABBIOType), an annotation uniform resource locator (URL) operation (for example, getABBAnnotationURL), a consumer layer type operation (for example, getConsumerLayerABBType), and a consumer type operation (for example, getConsumerType).

Creating at least one template using ABBs 1106 may include pre-configuring static templates using ABBS for specific service scenarios. The ABB interface and attributes facilitate creation of the at least one template. A user makes selections pre-configured templates based on a specific service scenario. This aspect of the invention is also referred to as static template configuration. Initially, there could be a template by Consumer Type. Later on, different variations within a specific consumer type can be added.

Figure 12:
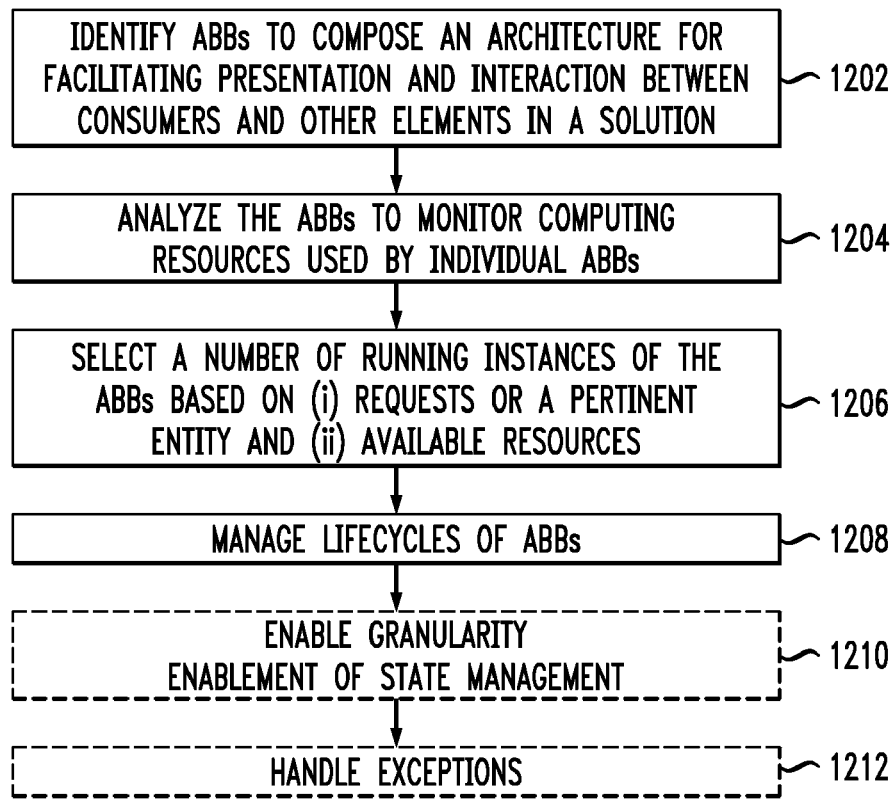
FIG. 12 is a flow diagram illustrating an exemplary method for designing and managing fine-grained ABBs, according to yet another aspect the invention.

Creating at least one template using ABBs 1006 may also include selecting appropriate ABBs based on user-specified characteristics, for example, ABB attributes. Appropriate ABBs are selected, based on the attributes, and configured during run time This aspect of the invention, also referred to as dynamic template configuration, is flexible and can support different variations which will be configured during run time FIG. 12 shows a flow diagram illustrating a method for designing and managing fine-grained ABBs, according to one embodiment of the invention. Step 1202 includes identifying ABBs to compose an architecture for facilitating presentation and interaction between consumers and other elements in a solution. Step 1204 includes analyzing the ABBs to monitor computing resources used by individual ABBs. Step 1206 includes selecting a number running instances the ABBs based on (i) requests a pertinent entity and (ii) available resources. Step 1208 includes managing life-cycles of ABBs. A method for designing and managing fine-grained ABBs, according to one embodiment of the invention, may optionally include step 1210, enabling granularity of state management. The method may also optionally include step 1212, handling exceptions.

Managing life-cycles of ABBs 1208 may include defining presentation architecture templates including interaction patterns of ABBs, selecting presentation architecture templates based on one or more services scenarios, configuring the interfaces of ABBs, applying interaction patterns for ABBs with other modules, and enabling access control on ABBs A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 13:
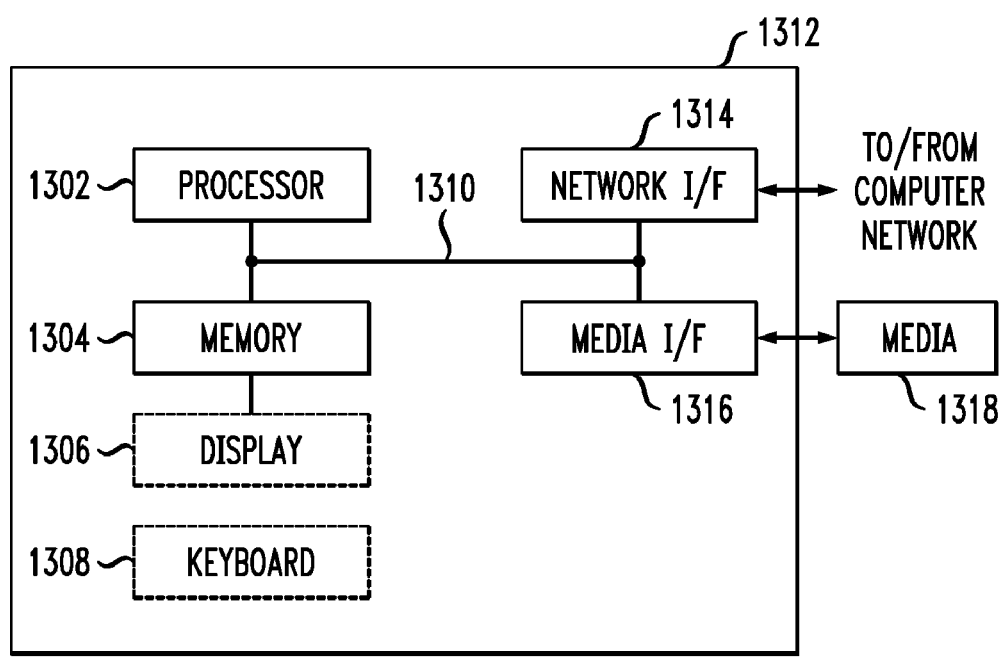
FIG. 13 is a system diagram of an exemplary computer system on which at least one embodiment of the present invention can be implemented.

At present, it is believed that the preferred implementation will make substantial use software running on a general-purpose computer or workstation. With reference to FIG. 13, such an implementation might employ, for example, a processor 1302, a memory 1304, and an input and/or output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1302, memory 1304, and input and/or output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1304), magnetic tape, a removable computer diskette (for example, media 1318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1302 coupled directly or, indirectly to memory elements 1304 though a system bus 1310. The memory elements can include local memory employed during actual execution of the program code, bulk storage, and cache memories which provide temporary storage of at least some program code in order to reduce the number of times code must be retrieved from bulk storage during execution Input and/or output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like Given the teachings of the invention provided herein, one of ordinary skill in the related art will be able to contemplate other implementations of the components of the invention At least one embodiment of the invention may provide one or more beneficial effects, such as, for example, supporting adaptation capability of a presentation module.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit the invention.

What is claimed is:

1. A method for representing and configuring flexible and extensible presentation patterns based on fine-grained architectural building blocks (ABBs), comprising the steps of:
defining ABBs;
modeling said ABBs in a uniform manner; and
creating at least one template using said ABBs, wherein said at least one template comprises at least one of pre-configured static characteristics and user-specified service characteristics, wherein said at least one template provides a basis for creating one or more additional ABBs and wherein one or more steps of said method are performed by one or more hardware devices.

2. The method of claim 1, wherein the step of defining ABBs comprises the step of defining a consumer ABB and a presentation controller ABB.

3. The method of claim 1, wherein the step of defining ABBs comprises the step of defining a presentation ABB, a consumer profile ABB, an access control ABB, a format transformation ABB, a configuration rule ABB, and a cache ABB.

4. The method of claim 1, wherein the step of defining ABBs comprises the step of dividing responsibilities of a presentation module into sub-responsibility areas.

5. The method of claim 4, wherein:
said sub-responsibility areas comprise logical grouping of related cohesive functions; and
said sub-responsibility areas are treated as ABBs.

6. The method of claim 1, wherein the step of defining ABBs comprises the step of defining attributes that are associated with an ABB, wherein said attributes comprise at least one of an identifier (ID) attribute, a type attribute, a state attribute, a protocol attribute, an input type and output type attribute.

7. The method of claim 1, wherein the step of modeling ABBs in a uniform manner comprises the step of using a unified framework to model said ABBs.

8. The method of claim 7, wherein said unified framework facilitates development of unified interface descriptions for said ABBs.

9. The method of claim 1, wherein the step of modeling ABBs in a uniform manner comprises the step of defining operations for said ABBs, wherein said operations comprise at least one of an identification operation, a name operation, a layer operation, a state operation, a protocol operation, an input data type operation, an output data type operation, an input and/or output type operation, an annotation uniform resource locator (URL) operation, a consumer layer type operation, and a consumer type operation.

10. The method of claim 1, wherein the step of creating at least one template comprises the step of pre-configuring static templates using ABBs for specific service scenarios.

11. The method of claim 1, wherein the step of creating at least one template comprises the steps of:
selecting appropriate ABBs based on said user-specified service characteristics; and
configuring said appropriate ABBs during run time.

12. An apparatus for representing and configuring flexible and extensible presentation patterns based on fine-grained architectural building blocks (ABBs), comprising:
a memory; and
at least one processor coupled to said memory and operative to:
define ABBs;
model said ABBs in a uniform manner; and
create at least one template using said ABBs, wherein said at least one template comprises at least one of pre-configured static characteristics and user-specified service characteristics, wherein said at least one template provides a basis for creating one or more additional ABBs.

13. The apparatus of claim 12, wherein the at least one processor is operable to define ABBs by defining a consumer ABB and a presentation controller ABB.

14. The apparatus of claim 12, wherein the at least one processor is operable to define ABBs by defining a presentation ABB, a consumer profile ABB, an access control ABB, a format transformation ABB, a configuration rule ABB, and a cache ABB.

15. The apparatus of claim 12, wherein the at least one processor is operable to define ABBs by dividing responsibilities of a presentation module into sub-responsibility areas.

16. The apparatus of claim 15, wherein:
said sub-responsibility areas comprise logical grouping of related cohesive functions; and
said sub-responsibility areas are treated as ABBs.

17. The apparatus of claim 12, wherein the at least one processor is operable to model ABBs in a uniform manner by using a unified framework to model said ABBs.

18. The apparatus of claim 17, wherein said unified framework facilitates development of unified interface descriptions for said ABBs.

19. The apparatus of claim 12, wherein the at least one processor is operable to create at least one template comprises pre-configuring static templates by using ABBs for specific service scenarios.

20. The apparatus of claim 12, wherein the at least one processor is operable to create at least one template by:
selecting appropriate ABBs based on said user-specified service characteristics; and
configuring said appropriate ABBs during run time.

21. A computer program product comprising a tangible computer useable readable recordable medium having computer useable program code for representing and configuring flexible and extensible presentation patterns based on fine-grained architectural building blocks (ABBs), said computer program product including:
computer useable program code for defining ABBs;
computer useable program code for modeling said ABBs in a uniform manner; and
computer useable program code for creating at least one template using said ABBs, wherein said at least one template comprises at least one of pre-configured static characteristics and user-specified service characteristics, wherein said at least one template provides a basis for creating one or more additional ABBs.

22. The computer program product of claim 21, wherein the computer useable program code for defining ABBs comprises code for defining a consumer ABB and a presentation controller ABB.

23. The computer program product of claim 21, wherein the computer useable program code for defining ABBs comprises code for defining a presentation ABB, a consumer profile ABB, an access control ABB, a format transformation ABB, a configuration rule ABB, and a cache ABB.

24. The computer program product of claim 21, wherein the computer useable program code for defining ABBs comprises code for dividing responsibilities of a presentation module into sub-responsibility areas.

25. The computer program product of claim 24, wherein:
said sub-responsibility areas comprise logical grouping of related cohesive functions; and
said sub-responsibility areas are treated as ABBs.

26. The computer program product of claim 21, wherein the computer useable program code for modeling ABBs in a uniform manner comprises code for using a unified framework to model said ABBs.

27. The computer program product of claim 26, wherein said unified framework facilitates development of unified interface descriptions for said ABBs.

28. The computer program product of claim 21, wherein the computer useable program code for creating at least one template comprises code for pre-configuring static templates using ABBs for specific service scenarios.

29. The computer program product of claim 21, wherein the computer useable program code for creating at least one template comprises code for:

selecting appropriate ABBs based on said user-specified service characteristics; and configuring said appropriate ABBs during run time.

* * * * *